Feb. 20, 1945.    A. N. CLASSON    2,369,715
FAN STOPPING DEVICE
Filed Jan. 16, 1943

Inventor
Albert N. Classon
By Munn, Liddy & Glaceum
Attorney

Patented Feb. 20, 1945

2,369,715

UNITED STATES PATENT OFFICE 2,369,715

FAN STOPPING DEVICE

Albert N. Classon, Leland, Ill.

Application January 16, 1943, Serial No. 472,644

3 Claims. (Cl. 175—375)

This invention relates to a device for stopping an electrical unit.

An object of the invention is the provision of a device for stopping an electrical unit when a condition arises in a space whereby it is unnecessary to maintain the unit in operation.

Another object of the invention is the provision of a device for opening a circuit to a fan which is used in a sleeping compartment for cooling the room, when the temperature of the room falls below a predetermined degree, said device, including a pair of switches, one for opening the circuit to the fan, the other for opening a circuit after said circuit has been closed, to actuate the operative opening means for the switches, the last mentioned circuit being closed temporarily by a thermostatically controlled switch.

The further object of the invention is the provision of a device for cutting off an electrically operated apparatus, such as a fan, when the temperature of the room in which a person is sleeping falls below a predetermined degree to prevent chilling of the person.

This invention will be best understood from a consideration of the following detailed description in view of the accompanying drawing forming a part of the specification; nevertheless, it is to be understood that the invention is not confined to the disclosure, being susceptible of such changes and modifications as define no material departure from the salient features of the invention as expressed in the appended claims.

Figure 1:
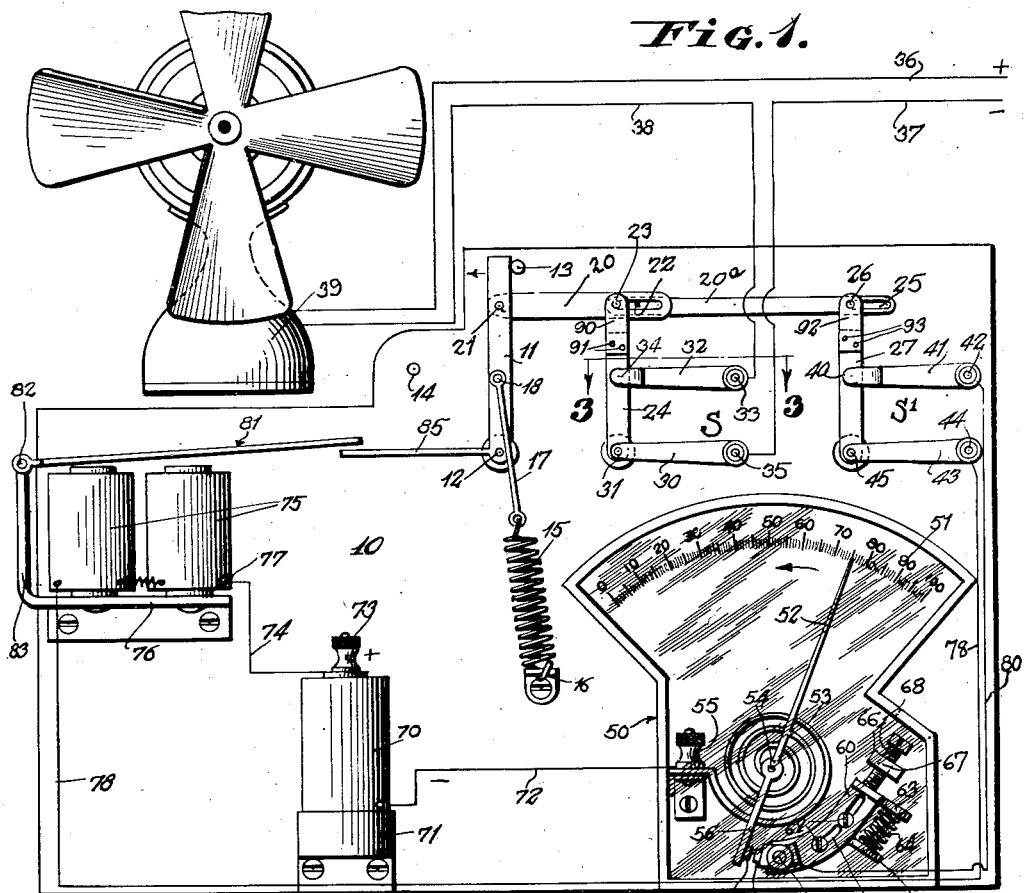
Fig. 1 shows more or less diagrammatically a view in elevation for controlling the operation of an electrical unit.
Figure 2:
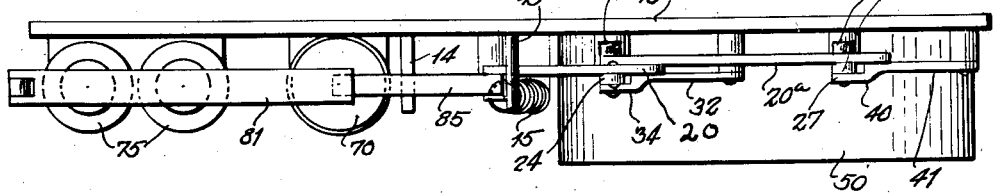
Fig. 2 is a plan view of the same.
Figure 3:
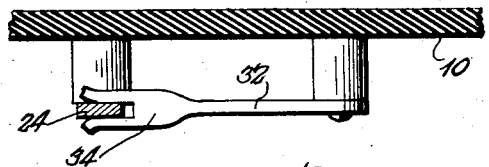
Fig. 3 is a horizontal section taken along the line 3—3 of Fig. 1.

Referring more particularly to the drawing, 10 designates a board on which the control elements are mounted. This board may be of any shape, but generally it is constructed in a manner which would be suitable for the assembling of the various elements.

A lever 11 is pivotally mounted at one end on a pin 12, which is connected to the board 10. The lever is limited by means of stops 13 and 14, projecting outwardly from the board. A spring 15 has one end secured through a bracket 16 connected to the board, while the other end thereof is connected to a link 17, which is also connected to a pin 18 projecting from the lever 11.

A reciprocating rod 20 is pivotally connected at 21 to the lever 11, and is provided with a slot 22 which receives a pin 23 secured to the upper end of a switch arm 24. A second rod 20ᵃ is provided with a slot 25, which receives a pin 26 at the upper end of a second switch arm 27. The rod 20ᵃ is pivoted on the pin 23.

The switch arm 24 forms part of a switch designated by the letter S, while the switch arm 27 forms part of a switch designated by the letter S'. The switch S includes a link 30 which is connected to a pin 31 on which the arm 24 is pivotally mounted. A contact member 32 is secured in place as shown at 33 to the board 10 and this member has a fork 34, that receives the switch arm 24 when said arm is in a vertical position as shown in Fig. 1. The link 30 as shown at 35 is secured to the board 10.

A pair of wires 36 and 37 is connected to a plug which is adapted to be received by the usual house sockets. Wire 37 extends to the link 30 while a wire 38 connects the one side of a motor which operates a fan 39 to the contact member 32. Wire 36 is connected to the positive side of the motor. Thus, it will be seen that the fan will be in operation as long as the arm 24 is received by the yoke 34. However, when said arm is moved away from the yoke the circuit to the same motor will be broken.

The arm 27 of the switch S' is also received by a yoke 40, carried by a contact member 41, which is secured at 42 to the board 10. A link 43 of said switch is connected at 44 to the board while the opposite end of said link is connected to a pin 45, upon which the arm 27 is pivotally mounted. The pins 33, 35, 42 and 44 are insulated from the board 10.

A thermostatic switch is included in the device, generally designated by the numeral 50.

This device includes a scale 51, a pointer 52, and a coiled thermostatic strip 53, which is connected with a shaft 54 to which the pointer is secured. The other end of the strip is connected to a binding post 55. One end of the pointer 52, as shown at 56, carries a contact 57, which is adapted to engage a contact 58, carried by a binding post 59. Posts 55 and 59 are insulated from the connected parts.

A slidable plate 60 carries the binding post 59, and is provided with slots 61 which receives bolts 62 which are fixed to the member 50. The plate 60 has an extension 63, which is forced upwardly by means of a spring 64, with the spring having one end in engagement with extensions 63 while the other end engages in lug 65, secured to the member 50. An ear 66 has a threaded perforation 67 to receive a threaded bolt 68, which has its inner end in engagement with the extension or flange 63, so that when the bolt is screwed inwardly against the flange 63 it will force the plate 60 downwardly against the tension of the spring 64. By this means the contact 58 is adjusted towards or away from the contact 57 for varying the point at which the pointer 52 will cause the contacts to engage by closing the thermostatic switch for a purpose which will be presently explained.

A battery 70 is supported by a bracket 71, secured to the board 10. A wire 72 connects the one side of the battery with the binding post 55. The battery is provided with a binding post 73 and a wire 74 connects the binding post 73 with a magnetic device 75.

The magnetic device is shown at 75 and is supported by a bracket 76 on the board 10. The wire 74 is connected with the wire of the magnetic device as shown at 77. A wire 78 connects the magnetic device with one end of the link 43. A wire 80 has one end connected with member 41, while the other end is connected with binding post 59. Thus, it will be seen that the switch S' in connection with the thermostatically operated switch controls the flow of current from the battery 70 to the magnetic means 75.

An armature 81 is pivotally mounted at 82 on an arm 83 of the bracket 76. The free end of the armature is in such a position that it will engage an arm 85 projecting laterally from the lower end of the lever 11. Thus it would be seen that when the magnetic means 75 is energized by the battery 70 the armature 81 will be drawn downwardly and will engage the arm 85 and thus rock the lever 11 to the left in Fig. 1, so that the tension of the spring 15 will cause the lever to snap rapidly to the left and fall into engagement with the stop 14.

The operation of my device is as follows:

When a room is warm the fan 39 is set in operation and the fan continues to operate as long as the switch S is closed. However, when the temperature of the room falls below a predetermined degree the thermostatic strip 53 will become active and the pointer will move in the direction indicated by the arrow in Fig. 1. Continued movement of the pointer in this direction will cause the contacts 57 and 58 to meet, whence the circuit to the magnetic means 75 will be closed.

The lever 11 is moved manually against the stop 13 and the spring 15 will hold the lever against the stop. When said lever is against the stop the pin 23 will be in one end of the slot 22 of the bar 20. At this time the pin 26 will be at a similar end of the slot 25. Therefore, the switch arms 24 and 27 will be in engagement with the respective yokes 34 and 40.

As soon as the arm 56 of the device 50 has moved the contact 57 into engagement with contact 58 the circuit to the magnetic means 75 and the battery 70 will be closed, whence the armature 81 will be drawn downwardly and act on the arm 85, causing the lever 11 to be moved in the direction indicated by the arrow in Fig. 1. When this lever passes the dead center relative to the spring 15 said lever will further snap to the left and engage the stop 14. As soon as this happens the switch arms 24 and 27 will be moved away from the respective yokes 34 and 40, thus breaking the circuit to the fan 39 and to the magnetic means 75.

When it is desired to reset the device for operating the fan 39, it must be done manually, by forcing the lever 11 in a direction which is opposite to the direction indicated by the arrow until the arms 24 and 27 again engage the respective yokes 34 and 40.

The slots 22 and 25 permit the lever 11 to be moved to the dead center without operating the arms 24 and 27 until the said lever goes past the dead center, whence the switches will be snapped open. Thus, sparking at the various electrical contacts will be eliminated.

The links, 30, 32, 41 and 43 are conductors as are the arms 24 and 27. However, an insulating fork 90 secured at 91 to the arm 24 and carrying the pin 23 prevents short circuiting when the rod 20 is formed of a conducting material. Similarly, an insulating fork 92 carries the pin 26 and is secured at 93 to the arm 27.

When lever 11 has reached the stop 14 both switches S and S' are opened so that the flashlight cell 70 is only required to supply current momentarily and therefore such cell will last a long time.

Both switches S and S' may be of any type in which switch S may be opened first followed by switch S'. In other words, switch S' remains closed just long enough for the magnet 75 to move lever 11 sufficiently in connection with the spring 15 to open switch S to cut off the motor to the fan 39 before the circuit to the magnet is cut off.

It will be noted that the lever 11 moves through a greater angle to reach the stop 14 than the arms 24 and 27 do to complete their functions. Both rods 20 and 20ª are reciprocated substantially the same distance, however the arms are not oscillated until the outer ends of the slots 22 and 25 engage the respective pins 23 and 26.

I claim:

1. In a system for controlling an electrically-operated unit, including a thermostatic switch for opening and closing a circuit to a magnet, the combination of a lever, pivoted at one end and having a lateral projection, a pair of switch arms pivoted at one end, a pin projecting from the other end of each arm, a rod pivoted at one end to the other end of the lever, and having a slot at the other end receiving the pin on one switch arm, a second rod having one end pivoted on said pin, the other end having a slot receiving the pin on the other switch arm, a contact member adapted to be engaged by the first-mentioned switch lever for closing a circuit to the unit, a second contact member adapted to be engaged by the second-mentioned switch arm for partially closing a circuit, including the magnet and the thermostatic switch, a spring maintaining the lever in position to retain the switch arms engaged with their respective contact members, and an armature operated by the magnet and engageable with the lateral projection for rocking the lever to cause the rods to move the switch arms away from the contact members.

2. In a system for controlling an electrically-operated unit, including a thermostatic switch for opening and closing a circuit to a magnet, the combination of a lever pivoted at one end and adapted to swing from a vertical position to one side of said position, a spring connected between the lever and a fixed point and in a substantially vertical alinement with said lever, a pair of switches adjacent said lever, each switch containing a switch arm and a contact member engageable with its associated arm, one switch opening a circuit to the unit, the other switch adapted to open a circuit, including the magnet and the thermostatic switch, a bar having one end pivoted on the free end of the lever, a second bar in alinement with the first bar, means pivotally connecting one end of the second bar with the switch arm of the first-mentioned switch, the first bar having a sliding connection with the last-mentioned means, a cooperating sliding connection between the second bar and the other switch arm, an arm projecting from the lever, and an armature operated by the magnet and engageable with the arm on the lever for moving the lever to one side of the vertical so that the spring will act to swing the lever sufficiently to move the switch arms away from the contact members.

3. In a system for controlling an electrically-operated unit including a thermostatic switch for opening and closing a circuit to said switch and a magnet, the combination of a lever pivoted at one end, a spring connected between the lever and a fixed point and adapted to rock the lever when said lever is moved to one side of the vertical, a switch opening a circuit to the unit and including a switch arm located in parallel relation with the lever and pivoted at one end, a contact member engaging the switch arm, a rod having one end pivotally connected to the free end of the lever, and provided with a slot at the other end, a pin projecting from the free end of the switch arm and received by the slot so that when the lever is moved away from the vertical position the bar will be moved and the switch arm will rock the switch arm away from the contact member when the pin on the switch arm reaches the outer end of the slot, a second switch operated by the rod for opening the circuit to the magnet and thermostatic switch, and an armature operated by the magnet for initiating rocking movement of the lever.

ALBERT N. CLASSON.